US009476357B2

(12) United States Patent
Owens

(10) Patent No.: US 9,476,357 B2
(45) Date of Patent: *Oct. 25, 2016

(54) METHOD AND APPARATUS FOR INCREASING COMBUSTION EFFICIENCY AND REDUCING PARTICULATE MATTER EMISSIONS IN JET ENGINES

(71) Applicant: HNO GreenFuels, Inc., Temecula, CA (US)

(72) Inventor: Donald Wade Owens, Temecula, CA (US)

(73) Assignee: HNO Green Fuels, Inc., Temecula, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/016,388

(22) Filed: Sep. 3, 2013

(65) Prior Publication Data
US 2014/0060070 A1 Mar. 6, 2014

Related U.S. Application Data

(63) Continuation-in-part of application No. 13/946,061, filed on Jul. 19, 2013, which is a continuation-in-part

(51) Int. Cl.
*F02C 7/22* (2006.01)
*C25B 1/04* (2006.01)
(Continued)

(52) U.S. Cl.
CPC . *F02C 7/22* (2013.01); *C25B 1/04* (2013.01); *C25B 9/08* (2013.01); *C25B 15/02* (2013.01);
(Continued)

(58) Field of Classification Search
CPC .............. F02C 7/22; F02C 3/20; F02C 3/22; C25B 1/04; Y02E 60/366

USPC .............. 205/628, 637; 123/DIG. 12; 60/275
See application file for complete search history.

(56) References Cited

U.S. PATENT DOCUMENTS 3,252,455 A   5/1966   Marshall
3,433,729 A   3/1969   Mikhailovich et al.
(Continued)

FOREIGN PATENT DOCUMENTS

DE   19504142     8/1995
WO   2009018814   2/2009
WO   2011150322   12/2011

OTHER PUBLICATIONS

J. Russell, et al "Hydrogen Generation by Solid Polymer Electrolyte Water Electrolysis", American Chemical Society, Chicago Symposium 1973, pp. 24-40.
(Continued)

*Primary Examiner* — William H Rodriguez
(74) *Attorney, Agent, or Firm* — Wagenknecht IP Law Group PC

(57) ABSTRACT

A portable on-demand hydrogen supplemental system producing hydrogen gas and mixing the hydrogen gas with the air used for combustion of the jet fuel to increase the combustion efficiency of said jet fuel. Hydrogen increases the laminar flame speed of the jet fuel during combustion thus causing more fuel to be burned and lowering particulate matter emissions. Hydrogen is supplied to the jet engine at levels well below its lower flammability limit in air of 4%. Hydrogen and oxygen is produced by an electrolyzer from nonelectrolyte water in a nonelectrolyte water tank. The system utilizes an onboard diagnostic (OBD) interface in communication with the jet's control systems, to regulate power to the system so that hydrogen production for the jet engine only occurs when the jet engine is running. The hydrogen gas produced is immediately consumed by the jet engine. No hydrogen is stored on, in or around the jet.

26 Claims, 13 Drawing Sheets

Related U.S. Application Data of application No. 13/922,351, filed on Jun. 20, 2013, which is a continuation-in-part of application No. 13/842,102, filed on Mar. 15, 2013, now abandoned, which is a continuation-in-part of application No. 13/224,338, filed on Sep. 2, 2011, now Pat. No. 8,449,754, which is a continuation-in-part of application No. 12/790,398, filed on May 28, 2010, now Pat. No. 8,499,722.

(60) Provisional application No. 61/313,919, filed on Mar. 15, 2010.

(51) Int. Cl.
   *C25B 15/02* (2006.01)
   *C25B 15/08* (2006.01)
   *C25B 9/08* (2006.01)
   *F02M 25/12* (2006.01)
   *F02C 3/22* (2006.01)

(52) U.S. Cl.
   CPC ............... *C25B 15/08* (2013.01); *F02C 3/22* (2013.01); *F02M 25/12* (2013.01); *Y02E 60/366* (2013.01); *Y02T 10/121* (2013.01)

(56) References Cited

U.S. PATENT DOCUMENTS

| | | | |
|---|---|---|---|
| 4,025,405 A | 5/1977 | Dotson et al. | |
| 4,031,865 A | 6/1977 | Dufour | |
| 4,271,793 A | 6/1981 | Valdespino | |
| 4,368,696 A | 1/1983 | Reinhardt | |
| 4,910,963 A * | 3/1990 | Vanzo | F01K 25/005 136/248 |
| 5,177,952 A * | 1/1993 | Stone | F01K 25/005 60/39.12 |
| 5,272,871 A | 12/1993 | Oshima et al. | |
| 5,711,865 A | 1/1998 | Caesar | |
| 6,033,549 A | 3/2000 | Peinecke et al. | |
| 6,257,175 B1 | 7/2001 | Mosher et al. | |
| 6,314,732 B1 * | 11/2001 | Lookholder | F01K 25/005 123/536 |
| 6,688,120 B2 | 2/2004 | Aoki et al. | |
| 7,021,249 B1 | 4/2006 | Christison | |
| 7,143,722 B2 | 12/2006 | Ross | |
| 7,458,368 B1 | 12/2008 | Huffman | |
| 7,552,702 B2 | 6/2009 | Stone | |
| 8,449,733 B2 | 5/2013 | Owens | |
| 8,449,734 B2 | 5/2013 | Owens | |
| 8,449,735 B2 | 5/2013 | Owens | |
| 8,449,736 B2 | 5/2013 | Owens | |
| 8,454,808 B2 | 6/2013 | Owens | |
| 8,499,722 B2 | 8/2013 | Owens | |
| 2004/0013918 A1 | 1/2004 | Merida-Donis | |
| 2004/0025808 A1 | 2/2004 | Cheng | |
| 2004/0203166 A1 | 10/2004 | Sullivan | |
| 2005/0223711 A1* | 10/2005 | Goldmeer | B63G 8/10 60/772 |
| 2005/0229872 A1 | 10/2005 | Lange | |
| 2006/0260562 A1* | 11/2006 | Otterstrom | F02B 47/02 123/3 |
| 2007/0151865 A1 | 7/2007 | Shimko et al. | |
| 2007/0205111 A1 | 9/2007 | Bayliss | |
| 2007/0209608 A1 | 9/2007 | Rutledge | |
| 2007/0259220 A1 | 11/2007 | Redmond | |
| 2008/0257284 A1* | 10/2008 | Otterstrom | F02B 47/02 123/2 |
| 2008/0257751 A1 | 10/2008 | Smola et al. | |
| 2009/0188240 A1 | 7/2009 | Suzuki et al. | |
| 2009/0283402 A1 | 11/2009 | Osman | |
| 2010/0012090 A1 | 1/2010 | Lewis | |
| 2010/0154381 A1* | 6/2010 | Rapp | F01K 23/10 60/39.181 |
| 2010/0183931 A1 | 7/2010 | Hedman | |
| 2010/0236921 A1 | 9/2010 | Yang | |
| 2010/0275858 A1 | 11/2010 | Jeffs et al. | |
| 2010/0293959 A1* | 11/2010 | Remy | F02C 3/22 60/773 |
| 2011/0048961 A1 | 3/2011 | Smedley | |
| 2011/0290201 A1 | 12/2011 | Owens | |
| 2011/0302909 A1* | 12/2011 | Botte | C25B 1/00 60/274 |
| 2012/0055422 A1 | 3/2012 | Owens | |
| 2012/0073521 A1 | 3/2012 | Owens | |
| 2012/0073522 A1 | 3/2012 | Owens | |
| 2012/0073523 A1 | 3/2012 | Owens | |
| 2012/0073524 A1 | 3/2012 | Owens | |
| 2012/0073525 A1 | 3/2012 | Owens | |
| 2012/0137950 A1* | 6/2012 | Rapp | C25B 1/12 114/331 |
| 2013/0276726 A1* | 10/2013 | Owens | C25B 15/02 123/3 |
| 2013/0305736 A1* | 11/2013 | Owens | F02C 7/22 60/776 |
| 2014/0203557 A1* | 7/2014 | Kim | F01K 23/10 290/2 |
| 2015/0226119 A1* | 8/2015 | Tanimura | F03G 6/00 60/39.12 |
| 2015/0337742 A1* | 11/2015 | Bernero | F02C 3/22 60/776 |
| 2015/0361833 A1* | 12/2015 | Hinders | F01K 3/242 290/1 R |

OTHER PUBLICATIONS

C. Kim et al, "Hydrogen Production from Water Using Polymer Electrolyte Membrane", American Institute of Chemical Engineers, Nov. 7, 2004.

I. Papagiannakis, "Studying and Improving the Efficiency of Water Electrolysis using a Proton Exchange Membrane", Thesis Submitted to Strathclyde University, 2005.

G. Yu, et al "Laminar Flame Speeds of Hydrocarbon + Air Mixtures with Hydrogen Addition," Combustion and Flame, vol. 63, pp. 339-347, (1986).

\* cited by examiner

METHOD AND APPARATUS FOR INCREASING COMBUSTION EFFICIENCY AND REDUCING PARTICULATE MATTER EMISSIONS IN JET ENGINES

CROSS-REFERENCE TO RELATED APPLICATIONS

This is a continuation-in-part application of U.S. application of U.S. application Ser. No. 13/946,061 filed on Jul. 19, 2013, which is a continuation-in-part application of U.S. application Ser. No. 13/922,351 filed on Jun. 20, 2013, which is a continuation-in-part of U.S. application Ser. No. 13/842,102, filed on Mar. 15, 2013, which is a continuation-in-part application of U.S. application Ser. No. 13/224,338, filed Sep. 2, 2011, now U.S. Pat. No. 8,449,736; which is a continuation-in-part application of U.S. application Ser. No. 12/790,398, filed May 28, 2010; which is a non-provisional of application Ser. No. 61/313,919, filed Mar. 15, 2010, the contents of which are incorporated herein by reference.

BACKGROUND OF THE INVENTION

1. Field of the Invention

The present invention relates to hydrogen generation devices. More particularly, the present invention relates to an apparatus and method for increasing the combustion efficiency, reducing particulate matter emissions and reducing fuel usage in jet or gas turbine engines and includes a portable hydrogen supplemental system that can be used with jet engines for burning a greater amount of fuel in the combustion chamber. The result is reduction in unburned fuel and particulate matter emissions.

2. Description of the Related Art

Jet engines are a source of gaseous and particulate emissions being released into the atmosphere. The number of species emitted by jet engines depends on the kind of fuel and the design of the jet engine. However, because the emissions of aircraft engines occur in the atmospheric regions (high troposphere and low stratosphere), which are very sensible to various perturbations, the problem of aviation effect on atmospheric processes and climate change has become very important.

Particulates in engine exhaust form because of incomplete combustion of the fuel within the combustion chamber of the jet engine. These particulates when released into the environment are harmful. Thus, particulate emissions are higher at low engine powers because combustion efficiency is lower. Particulate emissions from jet engines are highest at take-off and climb-out operations that require very high fuel flow rates. Therefore, data would be expected to show high particulate emissions around airports. Aerial depositions of exhaust particles from air traffic may have impacts on human health and the environment. High levels of ambient particulate matter have been found to adversely affect human respiratory systems, causing the development of asthma, lung cancer, and chronic bronchitis, among other problems.

Unlike internal combustion engines, particularly diesel engines where particulate filters are often employed to attempt to abate these particulate matter emissions, there is no known technology for reducing particulate matter emissions for jet engines. The best way to reduce particulate matter emissions is to improve combustion efficiency.

Also, as the cost of jet fuel has increased so has the need for a method and apparatus to reduce jet fuel usage.

SUMMARY OF THE INVENTION

The present invention relates to increasing the combustion efficiency of jet engines by using hydrogen and a method and apparatus for supplying hydrogen on-demand to a jet engine to increase said combustion efficiency. Hydrogen and oxygen is produced by an electrolyzer at low temperatures and pressure from nonelectrolyte water in a nonelectrolyte water tank. The hydrogen gas is passed through a hydrogen gas collector. A small amount of nonelectrolyte water that exits the electrolyzer during the process of producing the hydrogen enters the hydrogen gas collector and is passed back through to the nonelectrolyte water tank for distribution and water preservation. Nonelectrolyte water that exits the electrolyzer when the oxygen gas is produced by the electrolyzer is also passed back through the nonelectrolyte water tank. The hydrogen gas and the oxygen gas travel in separate directions, therefore the gases are kept separate. In the case of a jet engine, the hydrogen gas is mixed with the air used for combustion of the jet fuel, while the oxygen gas is returned to the nonelectrolyte water tank to be vented to the atmosphere. The system can be powered by the jet's Auxiliary Power Unit (APU), a standalone battery, waste heat, solar or wind energy. The system utilizes an engine sensor or an onboard diagnostic (OBD) interface in communication with the jet's control terminal, to regulate power to the system and therefore hydrogen production for the jet engine only occurs when the jet engine is running and according to the RPM of the engine. Therefore, as the hydrogen gas is produced it is immediately consumed by the jet engine. No hydrogen is stored on, in or around the jet.

Hydrogen has a high specific energy, high flame propagation speed and wide range of flammability and as such offers rich potential to promote combustion efficiency and reduce pollutant emissions in jet fuel and other types of hydrocarbon-based fuels.

The flammability range of a gas is defined in terms of its lower flammability limit (LFL) and its upper flammability limit (UFL). The LFL of a gas is the lowest gas concentration that will support a self-propagating flame when mixed with air and ignited. Below the LFL, there is not enough fuel present to support combustion; the fuel/air mixture is too lean. The LFL of hydrogen is around 4%.

The UFL of a gas is the highest gas concentration that will support a self-propagating flame when mixed with air and ignited. Above the UFL, there is not enough oxygen present to support combustion; the fuel/air mixture is too rich. The UFL of hydrogen is around 75%.

Between the two limits is the flammable range in which the gas and air are in the right proportions to burn when ignited, if hydrogen was the only fuel being combusted.

Two related concepts are the lower explosive limit (LEL) and the upper explosive limit (UEL). These terms are often used interchangeably with LFL and UFL, although they are not the same. The LEL is the lowest gas concentration that will support an explosion when mixed with air, contained and ignited. Similarly, the UEL is the highest gas concentration that will support an explosion when mixed with air, contained and ignited. The LEL of hydrogen is 15% and the UFL of hydrogen is 59%. Since the hydrogen being used to promote combustion efficiency in a jet engine is not contained and ignited, the LEL and UFL have no direct influence on the operation of the present invention.

Hydrogen is mixed with the air that is used for combustion. The fundamental combustion parameter that compactly characterizes and quantifies the effects of hydrogen addition is the laminar flame speed, which embodies information about the exothermicity, reactivity and diffusivity of the resulting mixture. The hydrogen gas increases the laminar flame speed of the jet fuel and thereby improves the combustion efficiency of the jet fuel. Further, an environmental benefit of the process is that breathable oxygen is produced and released to the atmosphere while the hydrogen gas is injected into the air used for combustion.

To-date, experiments have been conducted for the hydrocarbon fuels methylcyclohexane, toluene, decalin, propane and kerosene. For each fuel, flame speed data were measured under various conditions. Results show a surprising increase in laminar flame speed with added hydrogen. In some cases the results were almost linear. The exact nature of the hydrogen-enhanced burning is seen to depend on the fuel volatility. Under some conditions, hydrogen addition was observed to increase the hydrocarbon burning rate by more than a factor of two. The flame speed increase for many fuels extends to normal and elevated pressures.

The amount of hydrogen mixed with the air for combustion does not approach the LFL, UFL, LEL or UEL mentioned above.

With this increase in combustion efficiency, particulate matter emissions can also be reduced.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

Figure 1:
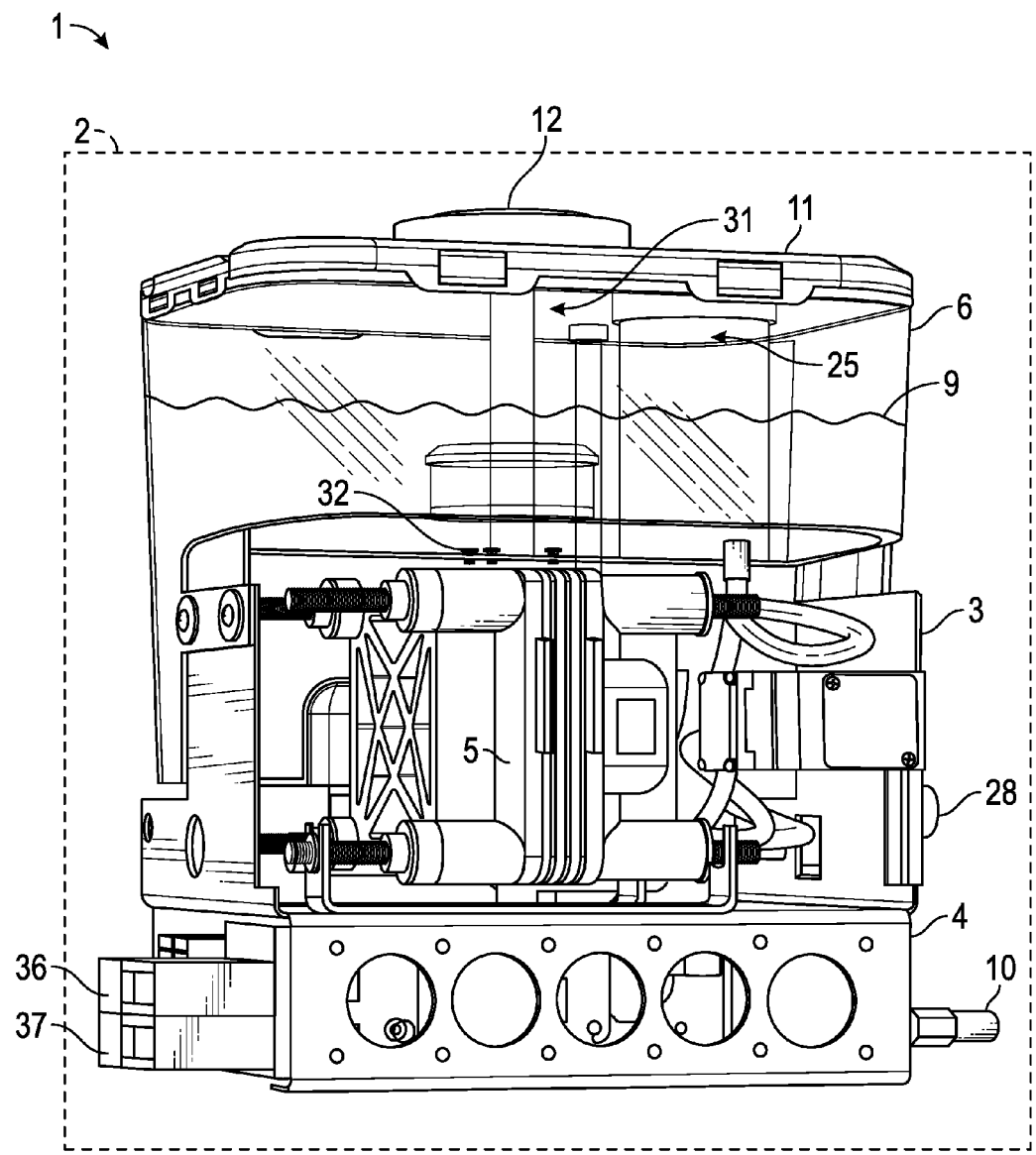
FIG. 1 is a detailed drawing of a front view of a portable hydrogen supplemental system showing a water tank and other components of an interior housing according to the present invention.

The present invention as will be described in greater detail below provides an apparatus, method and system, particularly, for example, a hydrogen supplemental system used to increase the combustion efficiency and reduce particulate matter emissions for jet engines. The present invention provides various embodiments as described below. However it should be noted that the present invention is not limited to the embodiments described herein, but could extend to other embodiments as would be known or as would become known to those skilled in the art. Various components of a portable hydrogen supplemental system 1 are discussed below with reference to FIGS. 1 through 4. The present invention as shown in FIG. 1 provides the portable hydrogen supplemental system 1 which includes a housing unit 2 as outlined via the dashed line shown, that can be secured on a flat surface of a structural component (e.g., a fuselage) of the jet by mounting brackets and fastening units. Inside the housing unit 2 are an electrolyzer 5 and a nonelectrolyte water tank 6 positioned above the electrolyzer 5. The nonelectrolyte water tank 6 is configured to receive nonelectrolyte water 9 therein from an external water source (not shown) via an external water supply connector 10, for supplying the nonelectrolyte water 9 to the electrolyzer 5. The nonelectrolyte water tank 6 is arranged above the electrolyzer 5, in such a manner as to supply the nonelectrolyte water 9 to the electrolyzer 5 by gravity. The nonelectrolyte water tank 6 is supported in the housing unit 2 above the electrolyzer 5 by support 3. The housing unit 2 further includes a separate sub-housing assembly 4 for housing electrical components of the portable hydrogen supplemental system 1. The housing unit 2 is designed to be readily removable from the jet.

Figure 2:
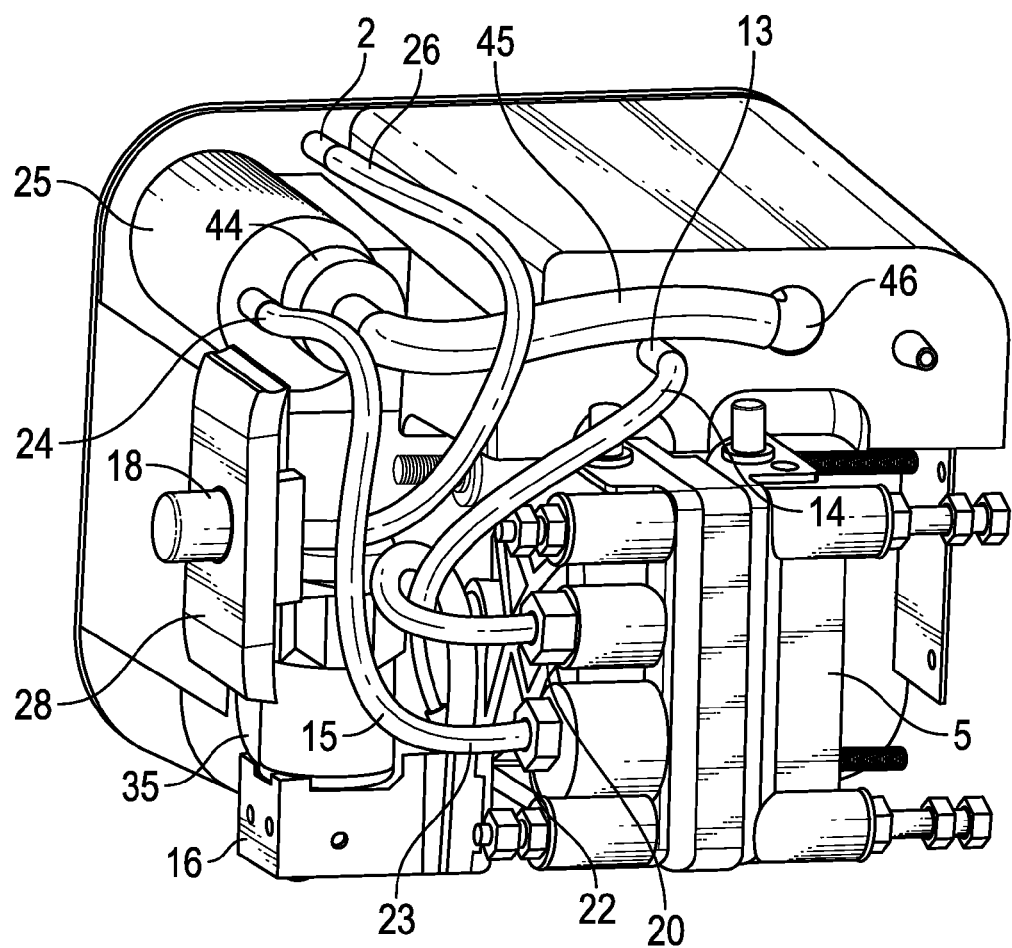
FIG. 2 is a detailed drawing of a bottom side view of the portable hydrogen supplemental system according to the present invention.
Figure 3:
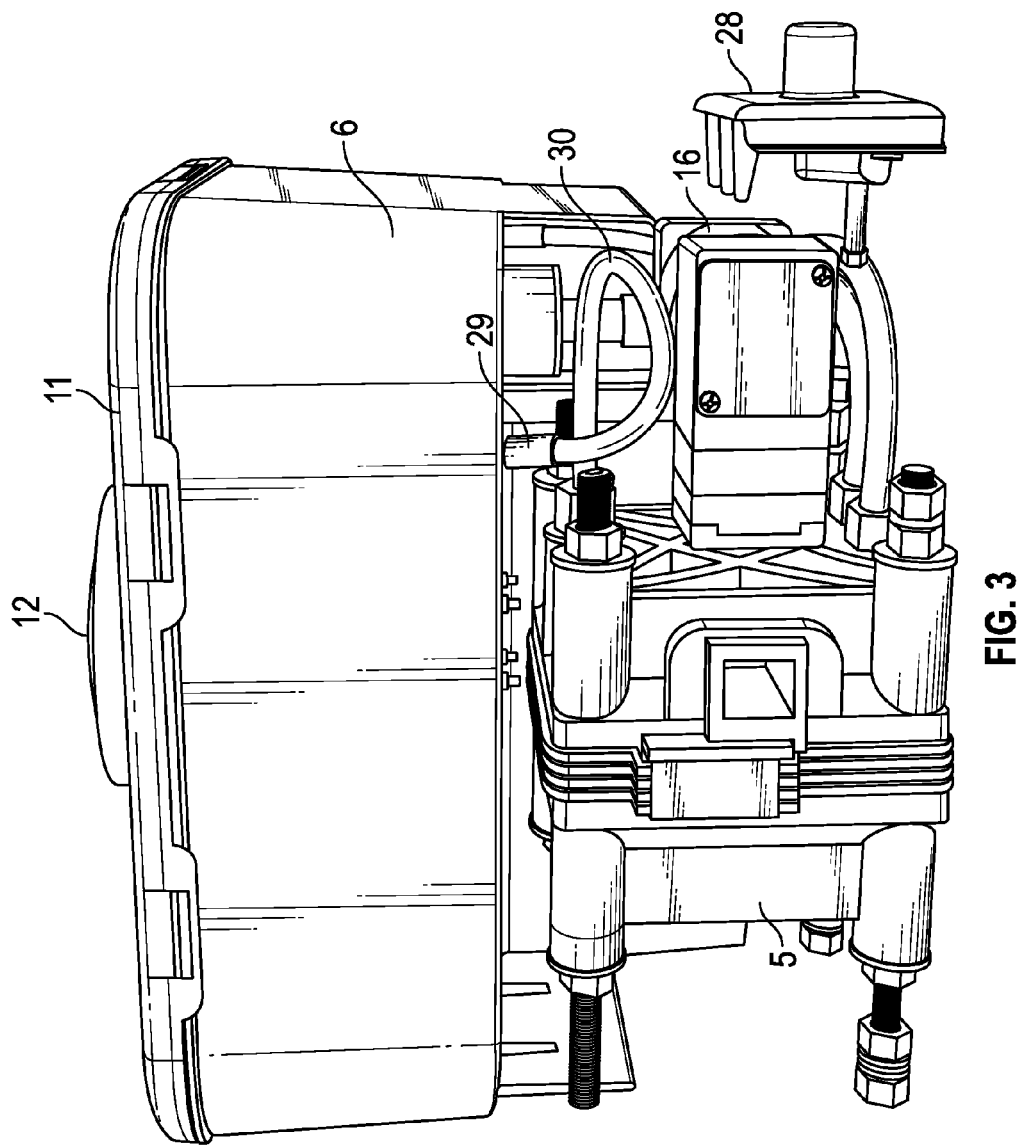
FIG. 3 is a detailed drawing of a rear side view of the portable hydrogen supplemental system according to the present invention.

The nonelectrolyte water tank 6 includes a cover 11 covering a top surface of the nonelectrolyte water tank 6, the cover 11 including a fill spout 12 and spout cover 12*a* at a top portion thereof for receiving nonelectrolyte water 9 in the nonelectrolyte water tank 6 and filling the nonelectrolyte water tank 6, and a water supply fitting 13 (as shown in FIG. 2) positioned on a rear side of the nonelectrolyte water tank 6 connected to a tube or other supply means 14 that is in turn connected to a water inlet fitting 15 on a pump device 16 for pumping the nonelectrolyte water 9 into the electrolyzer 5. It should be noted that the pump device 16 is provided to maintain a predetermined water pressure of the nonelectrolyte water 9 being supplied to the electrolyzer 5. However, if the water pressure is not an issue, the pump device 16 is an optional element. Nonelectrolyte water 9 is then supplied to the electrolyzer 5 by a tube or other supply 18 connected to the electrolyzer 5 via a connector means 20. The electrolyzer 5 decomposes nonelectrolyte water 9 into hydrogen gas $H_2$ and oxygen gas $O_2$ when received from the nonelectrolyte water tank 6. The electrolyzer 5 also includes a hydrogen gas outlet fitting 22 (as depicted in FIG. 2) connected via tubes or additional supply means 23 and a fitting 24, to a hydrogen gas collector 25 formed at a rear side of the nonelectrolyte water tank 6. Details of the hydrogen gas collector 25 will be discussed below with reference to FIGS. 7 and 8A-8D. Further, as shown in FIG. 2, hydrogen gas collected within the hydrogen gas collector 25 is disbursed to the combustion engine (i.e., a jet engine) via a hydrogen outlet fitting 26 and a supply means or other tubing 27, to a hydrogen outlet 28 disposed at a perimeter of the portable hydrogen supplemental system 1. For example, as shown in FIG. 1, according to one embodiment, the hydrogen outlet 28 may be formed below the pump device 16. Oxygen gas and water mixture generated from the electrolyzer 5 is sent to the nonelectrolyte water tank 6 via an oxygen outlet fitting 29 of the electrolyzer 5 and a supply means or other tubing 30 to a tank fitting 30a as shown in FIG. 3.

Referring back to FIG. 1, the nonelectrolyte water tank 6 further includes a float assembly 31 configured to perform a floating operation indicative of a level of the nonelectrolyte water 9 within the nonelectrolyte water tank 6. Details of the operation of the float assembly 31 will be discussed below with reference to FIGS. 6A and 6B. A water level sensor 32 is also provided at a bottom surface of the nonelectrolyte water tank 6, and is configured to magnetically communicate with the float assembly 31, to determine the level of the nonelectrolyte water 9. A temperature sensor may also be provided. The temperature sensor may be mounted within the nonelectrolyte water tank 6 or any suitable location within the housing 2 and be configured to sense a temperature of the nonelectrolyte water 9. A heater may further be provided along a surface of the electrolyzer 5, mounted to a sub-housing assembly or any other suitable location within the housing 2, and configured to heat the nonelectrolyte water 9 when it is detected via the temperature sensor that the nonelectrolyte water 9 has dropped below a predetermined temperature (e.g., 32 degrees). The nonelectrolyte water tank 6 may also include a tank vent port (not shown) for releasing oxygen gas within the nonelectrolyte water tank 6 via a tube or other venting means (e.g. in the fill spout cover 12a, for example.

Figure 4:
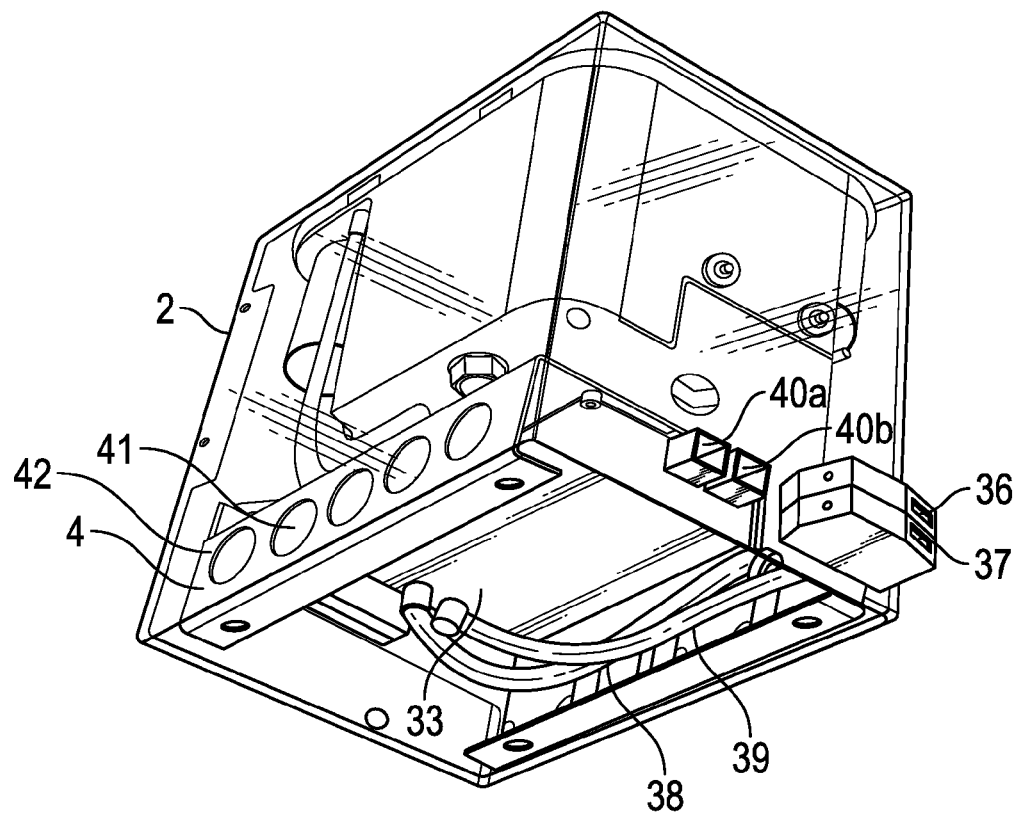
FIG. 4 is a diagram illustrating an embodiment of a sub-housing assembly, housing the control circuit and other electrical components of the portable hydrogen supplemental system, according to the present invention.

In FIG. 4, a main power board 33 is disposed beneath the electrolyzer 5 in the separate sub-housing assembly 4, for example, of the system 1 and configured to supply power to the system 1 using power received via power terminals 36 and 37 connected to the main power board 33 via negative and positive electrical wiring 38 and 39. Additional connectors 40a and 40b are provided for connecting other electrical components of the system 1 thereto (e.g., an on-board diagnostic (OBD) interface). Further, power terminals 36 and 37 are connected to a battery of the jet, for supplying power to the system 1. The sub-housing assembly 4 includes through-holes 41 for dissipating heat and cooling components of the main power board 33. An optional heat sink may also be provided on the main power board 33 for dissipating heat and cooling components of the main power board 33. Optional support holes 42 are also provided and configured to receive fastening units (e.g., screws) therein for fastening the sub-housing assembly 4 to the housing unit 2 (i.e., the main housing unit).

Referring back to FIG. 1, the electrolyzer 5 produces hydrogen and oxygen gases. Thus, the electrolyzer 5 essentially operates to decompose nonelectrolyte water 9 into hydrogen gas and oxygen gas and is hereinafter referred to as an electrolyzer 5. Nonelectrolyte water 9 fills the electrolyzer 5 from the nonelectrolyte water tank 6 and when a voltage, having positive and negative terminals, is placed across the electrolyzer 5 supplied from the main power board 33, hydrogen and oxygen gases are produced, at different outlets of the electrolyzer 5.

Referring back to FIG. 3, during operation of the electrolyzer 5, an oxygen gas and water mixture is generated in the electrolyzer 5 and released from the oxygen gas outlet fitting 29, through the supply means 30 and into the nonelectrolyte water tank 6 by way of tank fitting 30a. Further, hydrogen gas is generated in the electrolyzer 5 and supplied to the hydrogen gas collector 25. A small amount of nonelectrolyte water 9 will exit from the hydrogen gas outlet fitting 22 as the hydrogen gas is produced. The hydrogen gas collector 25 is configured to collect the hydrogen gas and the nonelectrolyte water 9 outputted from the electrolyzer 5. Since the oxygen gas and water mixture is released through the supply means 30 into the nonelectrolyte water tank 6, any nonelectrolyte water 9 of the oxygen gas and water mixture is returned back to the nonelectrolyte water tank 6. Further, any nonelectrolyte water 9 exiting from the hydrogen gas outlet fitting 22 with the hydrogen gas collected in the hydrogen gas collector 25 is returned to the nonelectrolyte water tank 6 via a water return port 44 of the tank 6, for returning the nonelectrolyte water 9 by a tube or other supply means 45 and a water tank fitting 46, to the nonelectrolyte water tank 6 for water preservation. The nonelectrolyte water 9 that comes out of the hydrogen outlet fitting 22 and the oxygen outlet fitting 29 during hydrogen and oxygen production is therefore maintained in the nonelectrolyte water tank 6. Additional details regarding the hydrogen gas collector 25 will be discussed below with reference to FIGS. 7 and 8A-8D. Based on the configuration of the system 1, the hydrogen gas and the oxygen gas generated in the electrolyzer 5 travel in different directions and are therefore kept separate from each other.

According to the invention the electrolyzer 5 can, for example, be a proton exchange membrane or polymer electrolyte membrane (PEM) electrolyzer. A PEM electrolyzer includes a semipermeable membrane generally made from ionomers and designed to conduct protons while being impermeable to gases such as oxygen or hydrogen. This is their essential function when incorporated into a membrane electrode assembly (MEA) of a proton exchange membrane electrolyzer or of a proton exchange membrane electrolyzer: separation of reactants and transport of protons.

As known, an electrolyzer is a device that generates hydrogen and oxygen from water through the application of electricity and includes a series of plates through which water flows while low voltage direct current is applied. Electrolyzers split the water into hydrogen and oxygen gases by the passage of electricity, normally by breaking down compounds into elements or simpler products.

Figure 5:
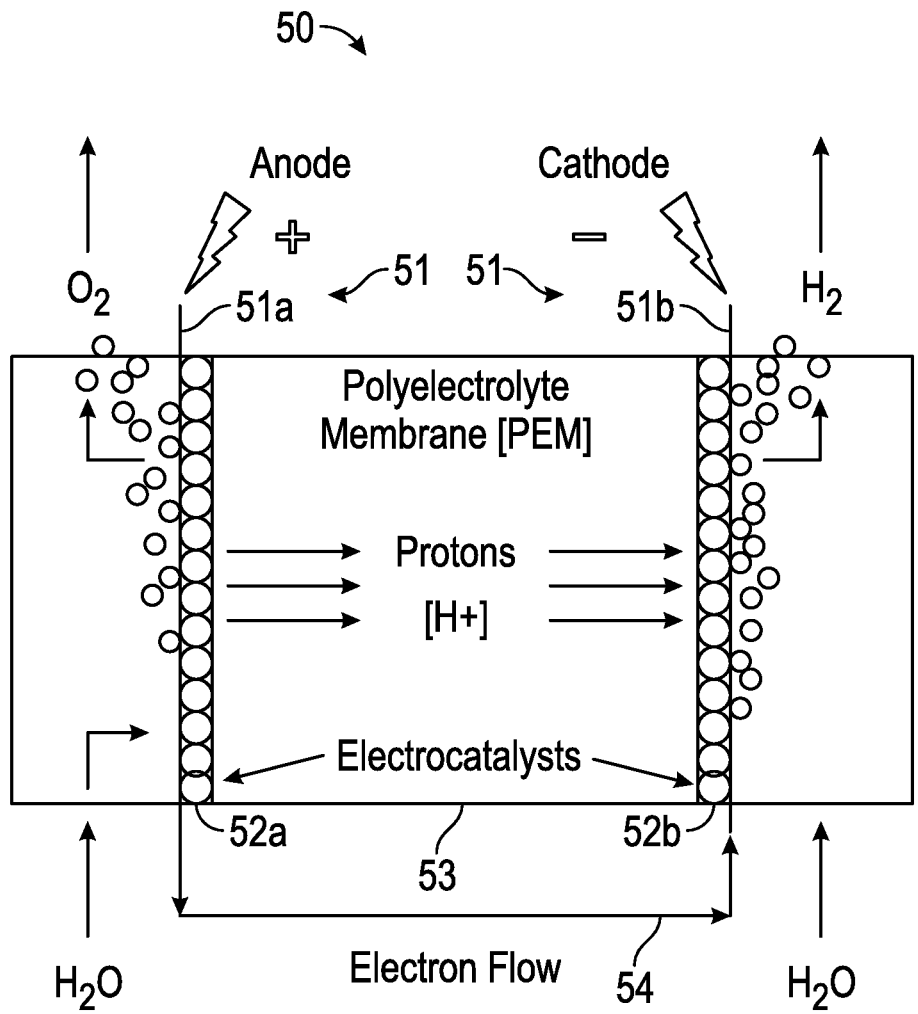
FIG. 5 is a diagram illustrating the operation and details of a PEM electrolyzer according to the present invention.

A PEM electrolyzer 50 is shown in FIG. 5, includes a plurality of layers which are non-liquid layers including at least two external layers and an internal layer, including external electrodes 51 disposed opposite to each other one of which is the anode 51a and the other of which is the cathode 51b, electrocatalysts 52a and 52b disposed respectively on the anode 51a and the cathode 51b, and a membrane 53 disposed between the electrocatalysts 52a and 52b. The PEM electrolyzer 50 further includes an external circuit 54 which applies electrical power to the anode 51a and the cathode 51b in a manner such that electrical power in the form of electrons flow from the anode 51a, along the external circuit 54, to the cathode 51b and protons are caused to flow through the membrane 53 from the anode 51a to the cathode 51b.

The efficiency of a PEM electrolyzer 50 is a function primarily of its membrane and electro-catalyst performance. The membrane 53 includes a solid fluoropolymer which has been chemically altered in part to contain sulphonic acid groups, $SO_3H$, which easily release their hydrogen as positively-charged atoms or protons $H^+$: $SO_3H \rightarrow SO_3^- + H^+$.

These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer side-chain. Thus, when an electric field is applied across the membrane 53 the hydrated protons are attracted to the negatively charged electrode, known as the cathode 51b. Since a moving charge is identical with electric current, the membrane 53 acts as a conductor of electricity. It is said to be a protonic conductor.

A typical membrane material that is used is called "nafion." Nafion is a perfluorinated polymer that contains small proportions of sulfonic or carboxylic ionic functional groups.

Accordingly, as shown in FIG. 5, nonelectrolyte water 9 enters the electrolyzer 5 and is split at the surface of the membrane 53 to form protons, electrons and gaseous oxygen. The gaseous oxygen leaves the electrolyzer 5 while the protons move through the membrane 53 under the influence of the applied electric field and electrons move through the external circuit 54. The protons and electrons combine at the opposite surface, namely the negatively charged electrode, known as the cathode 53b, to form pure gaseous hydrogen.

Figure 6A:
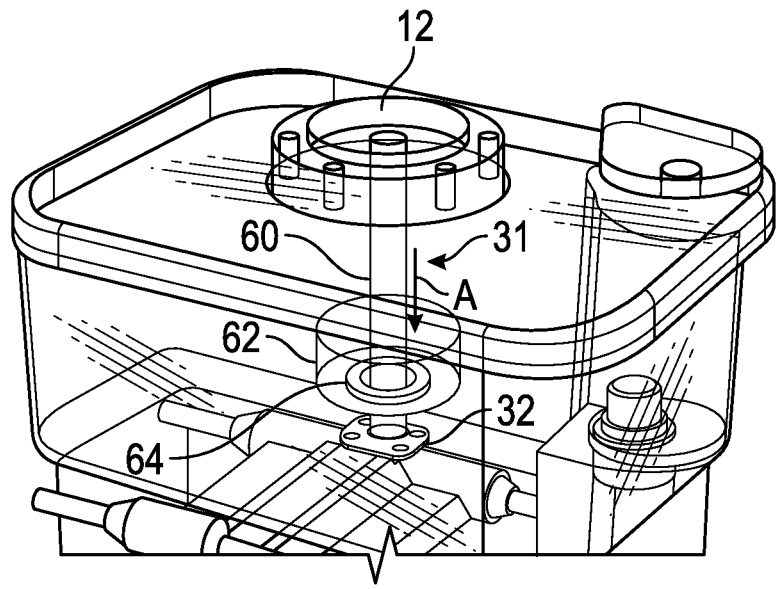
FIGS. 6A-B are diagrams of an embodiment of a float assembly of a water tank of the portable hydrogen supplemental system, according to the present invention.
Figure 6B:
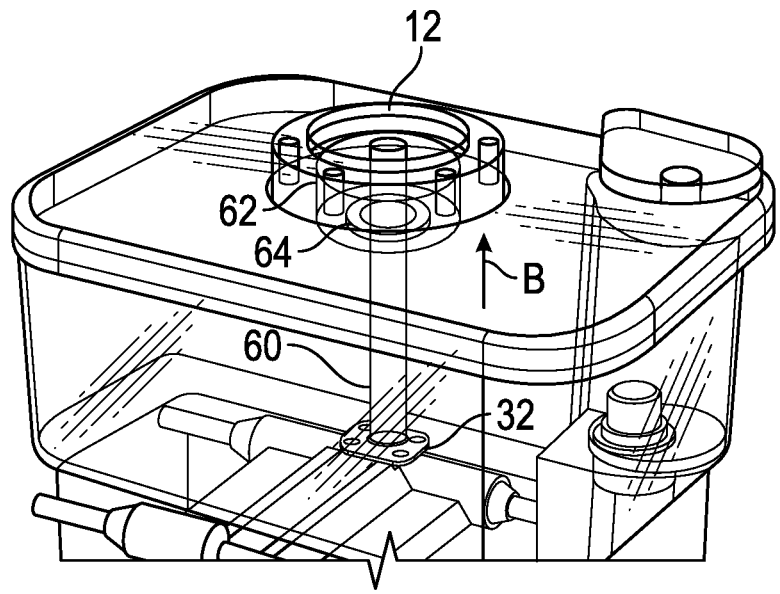

As shown in FIGS. 6A and 6B, an embodiment of the float assembly 31 includes a shaft 60 and a holding portion 62 housing a magnet 64. In FIG. 6A, as a water level of the nonelectrolyte water tank 6 decreases the holding portion 62 housing the magnet 64 travels along the shaft 60 in a downward direction as indicated by the arrow "A" and rests at a bottom portion of the nonelectrolyte water tank 6 when the tank 6 is completely empty. When the holding portion 62 is at or near a rest position on the shaft 60, a magnetic field produced by the magnet 64 is sensed by the water sensor 32 disposed beneath the nonelectrolyte water tank 6, to indicate that the water level is low. In FIG. 6B, as the nonelectrolyte water tank 6 is filled with the nonelectrolyte water 9 from the external water source, the holding unit 62 floats in an upward direction along the shaft 60, as indicated by the arrow "B." When the nonelectrolyte water tank 6 is completely filled, the holding portion 62 of the float assembly 31 rests at a top surface of the nonelectrolyte water tank 6, inside of the fill spout 12.

Figure 7:
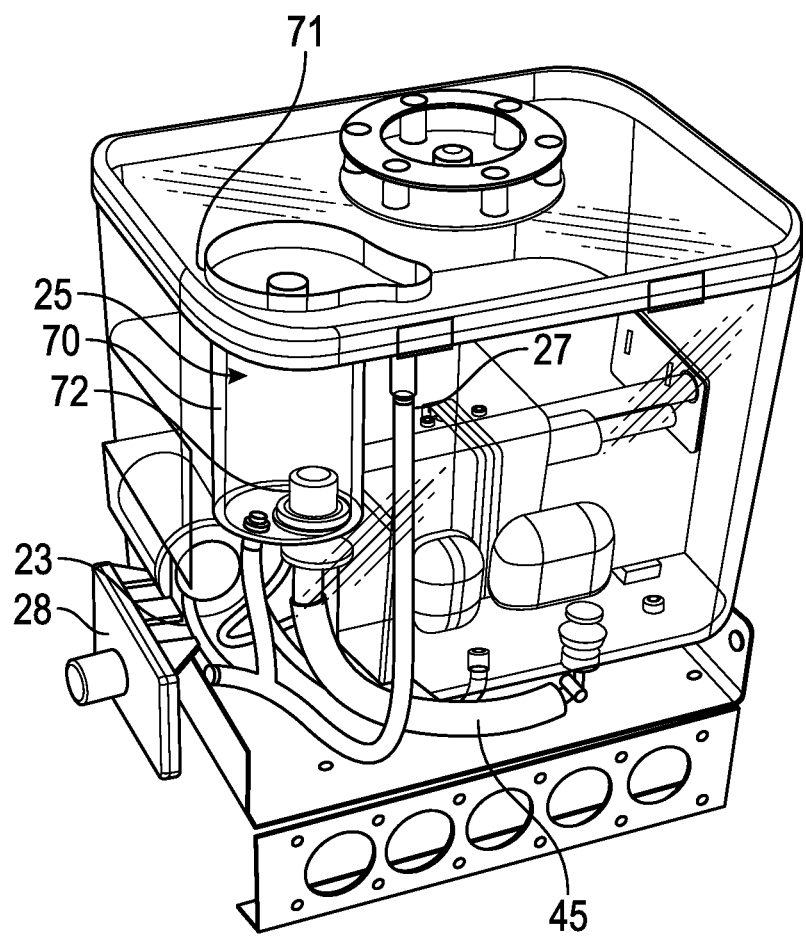
FIG. 7 is a diagram illustrating a view of the portable hydrogen supplemental system showing an embodiment of a hydrogen gas collector, according to the present invention.

FIGS. 7 and 8A-D are diagrams illustrating the operation and details of the hydrogen gas collector 25 according to embodiments of the present invention. As shown in FIG. 7, the hydrogen gas collector 25 includes a hydrogen gas collection portion 70, a cover portion 71 covering a top opening of the hydrogen gas collection portion 70, a float valve 72 stored within the hydrogen gas collection portion 70.

Figure 8A:
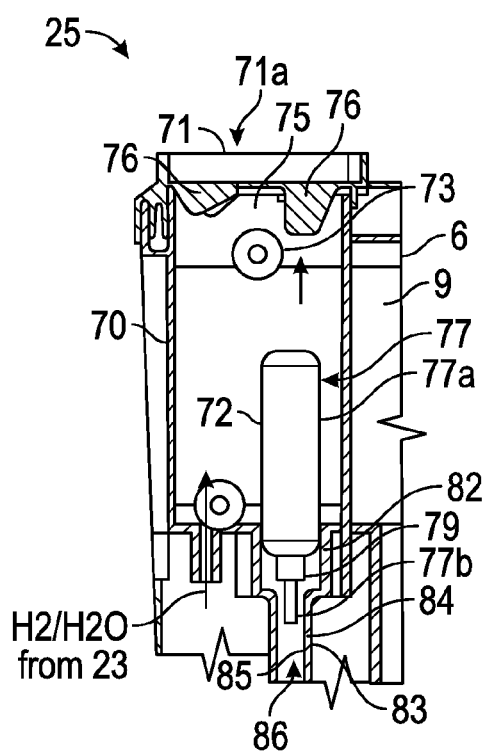
FIGS. 8A-D are diagrams illustrating the operation and details of the hydrogen gas collector of FIG. 7, according to the present invention.

Further, as shown in FIG. 8A, the hydrogen gas collector 25 further comprises a ball seal 73 stored within the hydrogen gas collection portion 70. The cover portion 71 comprises a center region 71a along an interior surface thereof, housing a protrusion portion 75 extending in a downward direction within the hydrogen gas collection portion 70. The protrusion portion 75 is configured to receive the ball seal 73 during operation of the hydrogen gas collector 25. The cover portion 71 further comprises flange portions 76 spaced a predetermined distance apart along the interior surface of the cover portion 71 and surrounding the protrusion portion 75 at the center region 71a thereof to direct the ball seal 73 to the center region 71a during normal operation of the hydrogen gas collector 25. The ball seal 73 may be formed of a polystyrene foam material, for example.

The float valve 72 comprises a valve body 77 having a top portion 77a and a lower portion 77b. A stopper 79 surrounds a side surface of the bottom portion 77b. According to one or more embodiments the float valve 72 may be formed of a plastic material and the stopper 79 may be formed of an elastomer material. The present invention is not limited to any particular type of material and may vary accordingly. The hydrogen gas collection portion 70 includes a valve receiving portion 80 for receiving the float valve 72. The valve receiving portion 80 includes a first receiving section 82 at a top thereof and a second receiving section 83 formed of a through-hole 84 at a bottom thereof. Flange portions 85 are formed between the first receiving section 82 and the second receiving section 83, and a return outlet 86 which is formed in the water return port 44 of the nonelectrolyte water tank 6. The top portion 77a of the float valve 72 is disposed within the first receiving section 82 and the bottom portion 77b of the float valve 72 is disposed within the through-hole 84 of the second receiving section 83.

According to one or more embodiments, the hydrogen gas collection portion 70 is configured to receive the hydrogen gas and the small amount of nonelectrolyte water 9 from the electrolyzer 5 via the tubes or additional supply means 23 and the fitting 24 (as depicted in FIG. 2).

During normal operation of the hydrogen gas collector 25, as the hydrogen gas collector portion 70 fills with the hydrogen gas and nonelectrolyte water 9, the nonelectrolyte water 9 therein returns to the nonelectrolyte water tank 6 via the tube or other supply means 45 connected with the water return port 44, for water preservation. As shown in FIG. 8A, the ball seal 73 floats as indicated by arrow "A" to a top of the hydrogen gas collection portion 70 as the hydrogen gas collection portion 70 is being filled with the nonelectrolyte water 9 or severe movements of the vehicle jossels the nonelectrolyte water 9 towards the top of the hydrogen gas collection portion 70 of the hydrogen gas collector 25.

Figure 8B:
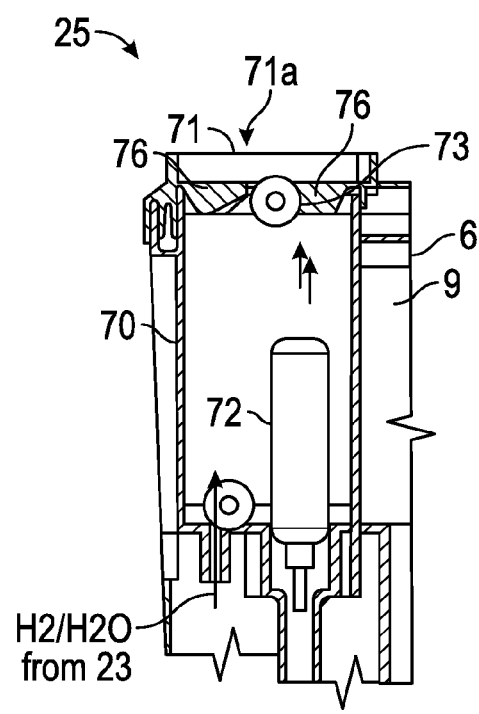

As shown in FIG. 8B, in the case of overfill of the hydrogen gas collection portion 70, the ball seal 73 is guided by the flange portions 76 to the center region 71a, and is secured on the protrusion portion 75 formed in the center region 71a and rests within the center region 71a of the cover portion 71.

Figure 8C:
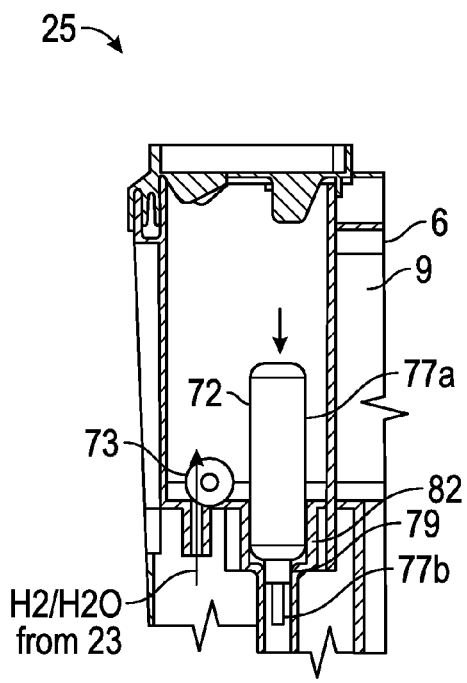

As shown in FIG. 8C, when the hydrogen gas collected within the hydrogen gas collection portion 70 is overpressure and the water level in the hydrogen gas collection portion 70 is low, the float valve 72 moves in a downward direction as indicated by arrow "B" and the stopper 79 prevents the hydrogen gas from flowing to the nonelectrolyte water tank 6 via the through-hole 86. Further, the ball seal 73 does not float upward towards the cover portion 71.

Figure 8D:
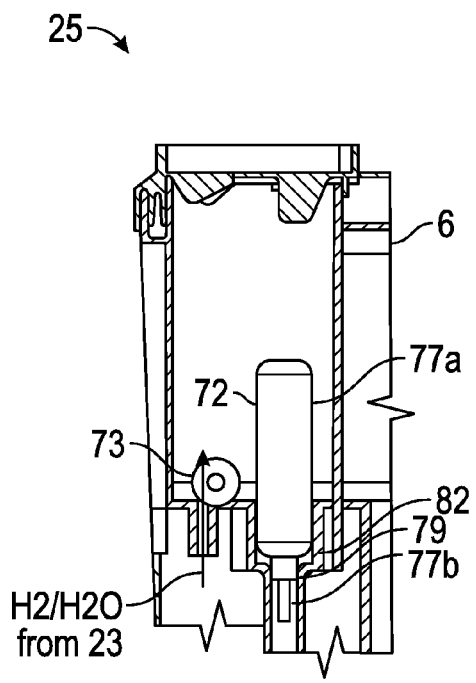

As shown in FIG. 8D, when the nonelectrolyte water 9 of the nonelectrolyte water tank 6 is of a low level causing the float assembly 31 to move downward on the shaft 60, the water level sensor 32 is triggered to notify an operator of the system 1 of the low water level within the nonelectrolyte water tank 6. As the water level in the hydrogen gas collection portion 70 increases, the float valve 72 rises, and gradually floats in an upward direction as shown in FIGS. 8A and 8B, to release the nonelectrolyte water 9 in a downward direction back to the nonelectrolyte water tank 6.

Further, the hydrogen gas is released in an upward direction towards the hydrogen fitting 26 (as depicted in FIG. 2) and to the hydrogen outlet 28 via the supply means or other tubing 27. The hydrogen gas $H_2$ then travels to the internal combustion engine for use during a combustion process thereof.

Figure 9:
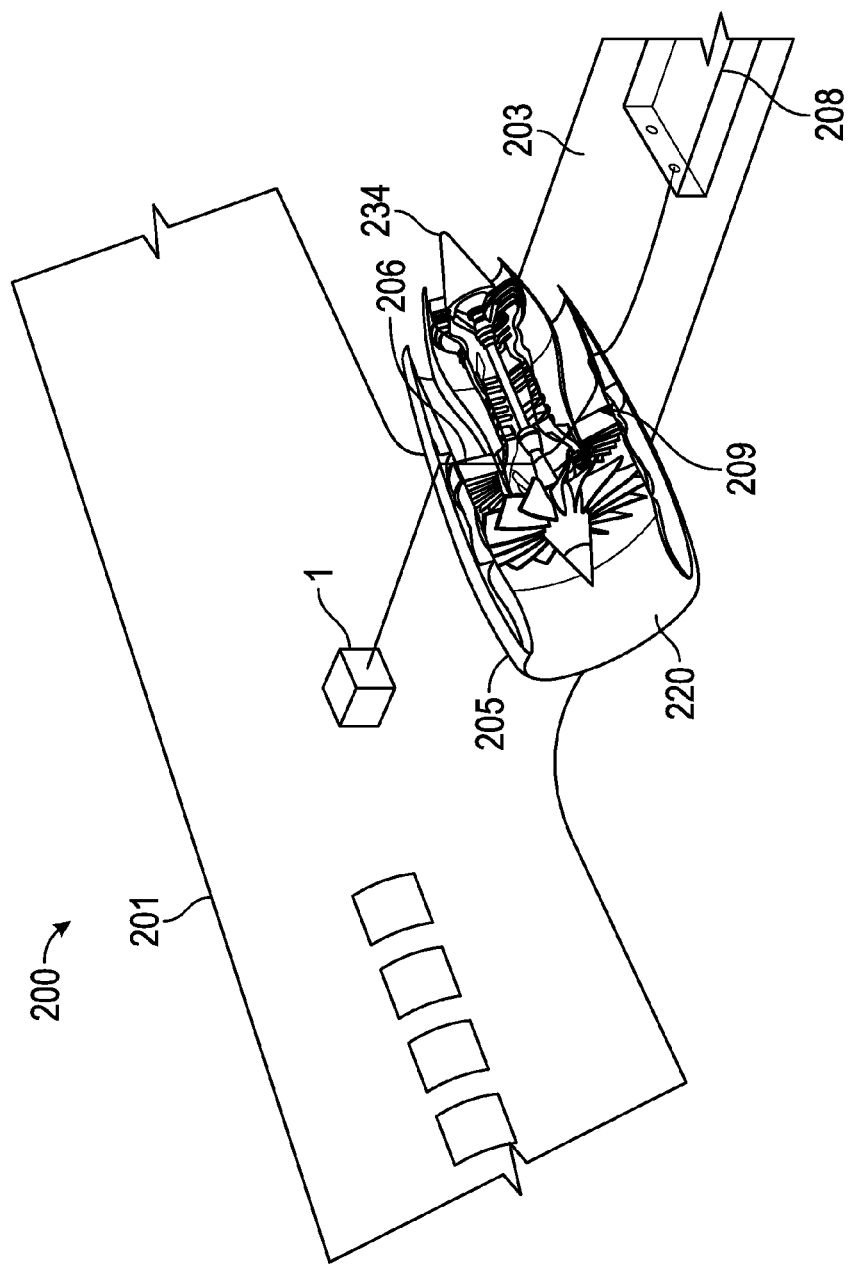
FIG. 9 is a detailed schematic of a jet having the portable hydrogen supplemental system installed therein that can be implemented according to embodiments of the present invention.

FIG. 9 is a detailed schematic of a jet 200 having the portable hydrogen supplemental system 1 of FIG. 1, installed therein that can be implemented according to embodiments of the present invention. As shown in FIG. 9, the jet 200 includes a fuselage 201, a plurality of wing portions 203 connected with the fuselage 201 and a jet engine 205. The jet 200 further includes the portable hydrogen supplemental system 1 mounted within the fuselage 201. The present invention is not limited to the system 1 being mounted within the fuselage 201. According to other embodiments of the present invention, the system 1 may be mounted near or on the wing portions 203 or in any other suitable location for the purpose set forth herein. The system 1 is connected with the jet engine 205 via a supply means 206 (e.g., tubing), to thereby supply hydrogen gas $H_2$ thereto. A fuel tank 208 may be provided in the wing portion 203 and supplying fuel to the jet engine 205 via a supply means 209 (e.g. tubing).

Figure 10:
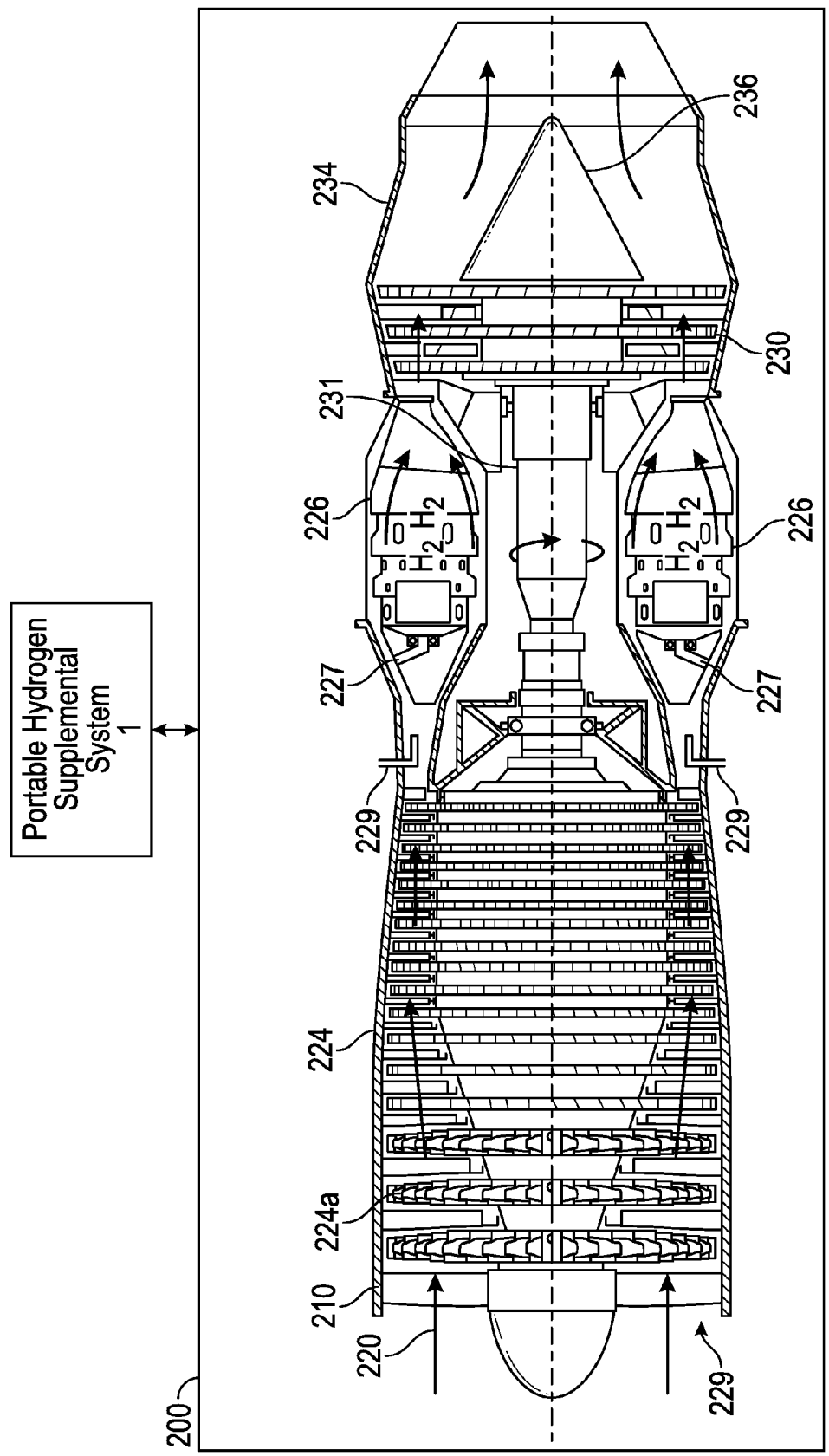
FIG. 10 is a detailed schematic of an exemplary jet engine in communication with a portable hydrogen supplemental system that can be implemented according to embodiments of the present invention.
Figure 11:
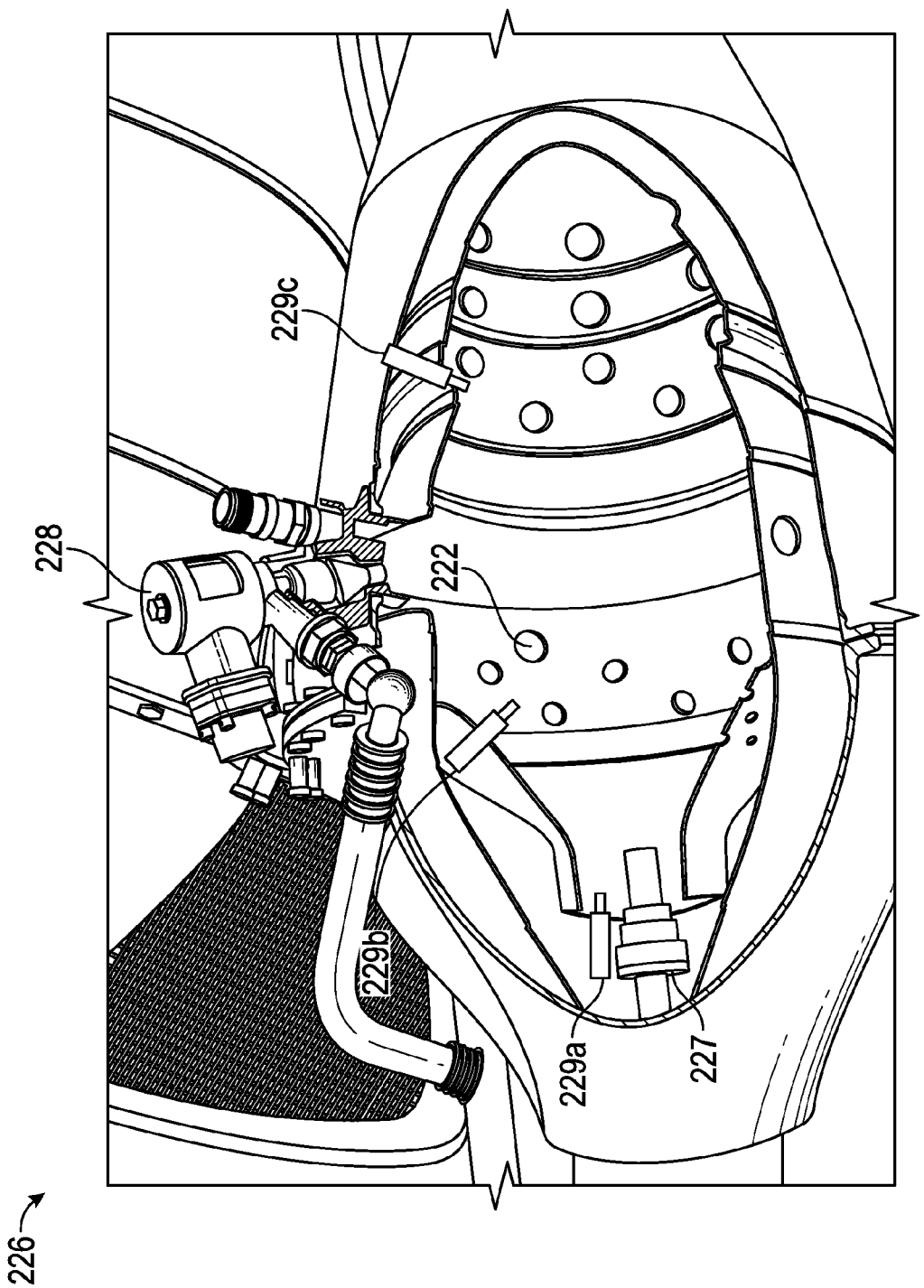
FIG. 11 is an illustration showing the combustion chamber of the jet engine of FIG. 10, receiving hydrogen gas from the portable hydrogen supplemental system.

As shown in FIG. 10, the jet engine 205 is in communication with the portable hydrogen supplemental system 1. The jet engine 205 comprises a housing portion 210 including an air intake 220, a compressor 224 having a plurality of compression blades 224a, a combustion chamber 226 disposed downstream of the compressor 224 having one or more fuel spray nozzles 227 connected thereto and a plurality of igniters 228 (as depicted in FIG. 11) therein, one or more hydrogen gas injectors 229, a power turbine 230 having a shaft 231 connected thereto, and an exhaust chamber 234.

The air intake 220 is configured to receive a free stream of air from the atmosphere into the jet engine 205. The air intake 220 is not limited to any particular size or shape and may vary, accordingly. Further, the air intake 220 is acted upon by the other components of the jet engine 205 discussed below.

The compressor 224 is disposed adjacent to the air intake 220 for receiving the air via the air intake 220. The compressor 224 is configured to increase the pressure of the incoming air before it enters the combustion chamber 226. According to an embodiment of the present invention, the compressor 224 may be of an axial or centrifugal type. When the compressor 224 is of an axial type, the air flows through the compressor 224 and travels in a direction parallel to the axis of rotation. When the compressor 224 is of a centrifugal type, the air flows through the compressor 224 and travels in a direction perpendicular to the axis of rotation.

The combustion chamber 226 is configured to receive fuel supplied through the one or more fuel spray nozzles 227 with extensive volumes of air supplied by the compressor 224. The combustion chamber 226 releases resulting heat so that the air is expanded and accelerated to provide a stream of uniformly heated gas. The amount of fuel added to the combustion chamber 226 is dependent upon the temperature required therein. The one or more igniters 228 (as depicted in FIG. 11) within the combustion chamber 226 are configured to ignite the air and fuel mixture therein. The stream of uniformly heated gas forms a flame 240. The flame 240 is viewed as a jet combustion wave which propagates through the air and fuel mixture within the combustion chamber 226. A laminar flame speed of the jet fuel is the property of the mixture and it is the speed at which the un-stretched flame 240 will propagate through the mixture of unburned fuel and air.

The one or more hydrogen gas injectors 229 are configured to inject hydrogen gas $H_2$ supplied by the portable hydrogen supplemental system 1 into the jet engine 205 via a supply means (e.g., a tubing) and connector means (e.g., fittings), to assist with combustion efficiency within the combustion chamber 226.

According to an embodiment of the present invention, the hydrogen gas increases the laminar flame speed of the jet fuel. Therefore, when the hydrogen gas $H_2$ mixed with the air and enters the combustion chamber 226, via the hydrogen gas injectors 229, 229a-229d, the hydrogen gas $H_2$ is ignited along with the fuel. In the combustion chamber 226, the fuel typically ignites from the center region thereof and burns outward. Since the hydrogen gas $H_2$ is dispersed throughout the combustion chamber 226 and being mixed with the air when ignited, fuel that is otherwise unburned is burned due to the ignition of the hydrogen gas $H_2$ adjacent thereto. Thus, according to embodiments of the present invention, there could be multiple points of ignition within the combustion chamber 226 instead of only a single point of ignition at the center region, possibly resulting in an even greater amount of unburned fuel being burned therein, thereby increasing combustion efficiency and reducing fuel consumption even more.

The burning speed of the hydrogen gas at approximately 8.7-10.7 ft/s (2.65-3.25 m/s) is nearly an order of magnitude higher than that of methane, gasoline or Jet-A1 (at stoichiometric conditions). Thus, the hydrogen gas $H_2$ injected therein via the hydrogen gas injectors 229a-229d is not being used as a fuel, but instead to enhance the combustion of the existing fuel being supplied to the jet engine 205. The presence of the hydrogen gas $H_2$ dispersed in the air used for combustion enables more of the fuel to be burned during the combustion process because of an increase in the laminar flame speed of the jet fuel, thus resulting in a reduction in unburned fuel and particulate matter.

According to one or more embodiments of the present invention, the one or more hydrogen gas injectors 229 may be disposed in various locations within the jet engine 205. According to one embodiment, the one or more hydrogen gas injectors 229 may be disposed at an input of the air intake 220, an input of the combustion chamber 226, adjacent to the fuel spray nozzle 227 (i.e., in front of the combustion chamber 226), within the combustion chamber 226 itself, or downstream of the fuel spray nozzles 227 on either side of the igniters 228.

According to one or more embodiments, the combustion chamber 226 may be formed of a single can-annular type combustion chamber, multiple chamber-type combustion chamber or an annular-type combustion chamber. The present invention is not limited to any particular type or number of combustion chamber 226 and may be vary as necessary. In this embodiment, two combustion chambers 226 are provided.

A power turbine 230 is also provided and is linked by a shaft 231 to turn blades 224a of the compressor 224, and configured to supply power within the jet engine 205 to drive the compressor 224 and other components. The power turbine 230 extracts energy from the gases released in the combustion chamber 226 such that a continuous flow of gas enters the power turbine 231 at a predetermined temperature.

The exhaust chamber 234 comprises one or more nozzles 236 therein disposed downstream of the power turbine 230, and configured to produce a thrust to propel the jet engine 205. The energy depleted airflow that passed through the power turbine 230 and the colder air that bypasses the compressor 224 together produces a force when exiting the one or more nozzles 232 to propel the jet engine 205. The exhaust chamber 231 further conducts the exhaust gases therein back to the free stream of air and sets a mass flow rate throughout the jet engine 205. Additional details regarding the ignition of fuel and hydrogen gas $H_2$ within the combustion chamber 226 will be discussed below with reference to FIG. 10.

FIG. 11 is an illustration showing the combustion chamber 226 of the jet engine 205 of FIG. 10, receiving hydrogen gas $H_2$ from the portable hydrogen supplemental system 1. As shown in FIG. 11, a plurality of hydrogen gas injectors 229a-229d are disposed throughout the combustion chamber 226, to thereby supply hydrogen gas $H_2$ therein. As shown, a hydrogen gas injector 229a is disposed adjacent to the fuel spray nozzle 227, a hydrogen gas injector 229b is disposed on a first side of the igniter 228, a hydrogen gas injector 229c is disposed on a second side of the igniter 228 opposite the first side thereof, and a hydrogen gas injector 229d is disposed within the structural body of the combustion chamber 226 itself. The present invention is not limited to any particular number of hydrogen gas injectors 229 and is not limited to the hydrogen gas injectors 229 being disposed in a particular location within the jet engine 205 and vary in number and be disposed in any suitable location for the purpose set forth herein.

The hydrogen gas injectors 229 (e.g., hydrogen gas injectors 229a-229d) are connected with the portable hydrogen supplemental system 1 via a supply means and a connector means. The hydrogen gas $H_2$ is disbursed into the jet engine 205 (e.g., within the combustion chamber 226) in a controlled manner at a rate ranging from 1 to 5 cubic meter per hour (or more depending on the jet engine). The injection of the hydrogen gas $H_2$ directly affects the laminar flame speed of the jet fuel entering the combustion chamber 226.

Further, an electrical circuit is provided to control the system 1 for supplying the hydrogen gas H2 to the jet engine 205.

Figure 12:
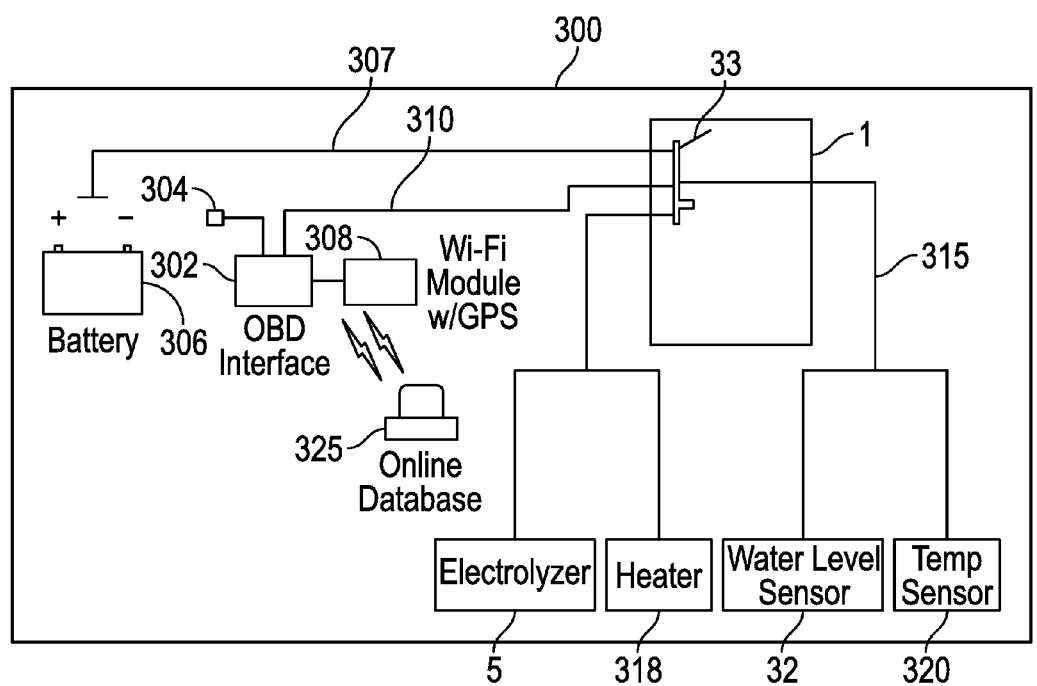
FIG. 12 is a diagram of an embodiment of a control circuit of the present invention.

FIG. 12 is a diagram of an embodiment of a control circuit 300 of the present invention. As shown in FIG. 12, the electrical circuit can, for example, be provided by the control circuit 300 is configured to control the system 1. The control circuit 300 includes an onboard diagnostic (OBD) interface 302 in communication with a jet control terminal 304 of the jet 200 and the main power board 33 of the system 1. A battery 306 is connected with the power terminals 36 and 37 at the main power board 33 via wires 207. The control circuit 300 further includes a communication module 308. According to one or more embodiments, the communication module 308 is a wireless module for wirelessly transmitting jet information via the OBD interface 302. The OBD interface 302 is configured to receive at least one or more data output of the jet control terminal 304, such as rotational speed (RPM) information of the turbine. When it is detected that the jet 200 is running, the OBD interface 302 sends a signal via the wire 310 to the main control board 33, to operate the system 1. For example, when the rotational speed of the jet engine 205 exceeds a predetermined level, a positive output is sent to the main power board 33, thereby causing the electrolyzer 5 to operate when the jet engine 205 is rotating. The hydrogen gas $H_2$ may be generated based on the jet engine speed or a predetermined RPM of the engine 205 or a combination of other outputs from the jet control terminal 304 such that the electrolyzer 5 is activated to generate hydrogen gas $H_2$ according to the jet engine speed or a predetermined RPM of the jet engine 205 or a combination of other outputs from the jet control terminal 304.

Further, according to one or more embodiments of the present invention, the amount of hydrogen gas injected via the injectors 229 (shown in FIGS. 10 and 11) may be varied during operation of the jet engine 205, based on the jet engine speed or a predetermined RPM of the engine 205, or a combination of other outputs of the jet control terminal 304, to thereby variably adjust the laminar flame speed of the jet fuel within the combustion chamber 226.

During various operations of the jet 200, the amount of fuel injected into the jet engine 205, and the amount of hydrogen gas $H_2$ generated and injected into the jet engine 205 may be varied, such that the amount of hydrogen gas $H_2$ is sufficient for assisting with burning of the amount of fuel injected into the combustion chamber 226.

During a take-off operation or a climbing operation of the jet 200, when the RPM of the jet engine 205 increases, the amount of hydrogen gas $H_2$ generated and injected via the hydrogen gas injectors 229 into the jet engine 205 is increased, to thereby accommodate for the increase in the amount of fuel injected into the jet engine 205 via the fuel injectors 228.

During a leveling operation, a cruising operation or a landing operation of the jet 200, the amount of hydrogen gas $H_2$ generated and injected into the jet engine 205 may be decreased based on a decrease in the RPM of the jet engine 205.

The generation of the hydrogen gas $H_2$ on-demand, and the control of the amount of hydrogen gas $H_2$ to be injected into the jet engine 205 results in an improvement of combustion efficiency within the combustion chamber 226 of the jet engine 205, and a reduction of unburned fuel and particulate matter.

Other components of the system 1 are also connected with the main power board 33 via wires 315. The other components include the electrolyzer 5, the water level sensor 32, a heater 318, and a temperature sensor 320.

According to one or more embodiments of the present invention, the OBD interface 302 is in communication with a database 325 (e.g., a web-based database), via the communication module 308, for receiving system information including status information. The status information may include, for example, water level information from the water level sensor 32 and temperature sensor information from the temperature sensor 320. The database 325 may further store historical data collected over time to be used to control operation or regulate maintenance of the system 1. For example, necessary re-filling of the nonelectrolyte water tank 6 may be determined based on the status information of the water level within the nonelectrolyte water tank 6.

According to alternative embodiments, in a jet engine 205, the electrical power used by the portable hydrogen supplemental system 1 is supplied by the jet engine APU. As described above the electrical power is supplied when the engine is operating and/or a combination of data output from the jet control terminal 304 exceeds predetermined levels.

One or more embodiments of the present invention provide a portable hydrogen supplemental system for supplying hydrogen gas to a jet engine of a jet. The system includes a housing unit, an electrolyzer mounted inside the housing unit that separates nonelectrolyte water into hydrogen and oxygen gas in response to electrical power, a nonelectrolyte water tank mounted inside the housing unit and positioned to supply nonelectrolyte water to the electrolyzer, a power supply for supplying the electrical power in the form of a voltage to the electrolyzer, an onboard diagnostic interface for interfacing with a control terminal of the jet, for detecting operation of the jet engine, and a plurality of hydrogen gas injectors configured to inject the hydrogen gas into the jet engine. The hydrogen gas travels into a combustion chamber of the jet engine, to assist with burning of fuel within the combustion chamber, and an amount of hydrogen gas generated by the electrolyzer, and injected by the hydrogen gas injectors into the jet engine is varied based on the operation of the jet engine as detected, and an amount of particulate matter exiting the combustion chamber is reduced by a predetermined amount compared to operation of the jet engine not using hydrogen gas based on an amount of the hydrogen gas traveling into the combustion chamber and an amount of fuel burned within the combustion chamber.

One or more other embodiments of the present invention provide a method of supplying hydrogen gas to a jet engine of a jet that includes supplying, from a nonelectrolyte water tank mounted inside the housing unit, nonelectrolyte water to an electrolyzer, detecting, by an onboard diagnostic interface in communication with a control terminal of the jet, operation of the jet engine, supplying, by a power supply, electrical power in the form of a voltage to the electrolyzer upon detecting that the internal combustion engine is in operation, producing, by the electrolyzer when supplied with the electrical power, hydrogen and oxygen gases from the nonelectrolyte water from the nonelectrolyte water tank, injecting, by a plurality of hydrogen gas injectors, the hydrogen gas into the jet engine, and varying an amount of the hydrogen gas injected into the jet engine based on the operation of the jet engine as detected. The hydrogen gas travels into a combustion chamber of the jet engine, to assist with burning of fuel within the combustion chamber, and an amount of particulate matter exiting the combustion chamber is reduced by a predetermined amount compared to operation of the jet engine not using hydrogen gas based on an amount of the hydrogen gas traveling into the combustion chamber and an amount of fuel burned within the combustion chamber.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A portable hydrogen supplemental system for supplying hydrogen gas to a jet engine of a jet, the portable hydrogen supplemental system comprising:
   a housing unit;
   an electrolyzer mounted inside the housing unit that separates nonelectrolyte water into hydrogen and oxygen gas in response to electrical power;
   a nonelectrolyte water tank mounted inside the housing unit and positioned to supply nonelectrolyte water to the electrolyzer;
   a power supply for supplying the electrical power in the form of a voltage to the electrolyzer;
   an onboard diagnostic interface for interfacing with a control terminal of the jet, for detecting operation of the jet engine; and
   a plurality of hydrogen gas injectors configured to inject the hydrogen gas into the jet engine,
   wherein the hydrogen gas travels into a combustion chamber of the jet engine, to assist with burning of fuel within the combustion chamber,
   wherein an amount of hydrogen gas generated by the electrolyzer, and injected by the hydrogen gas injectors into the jet engine is varied based on the operation of the jet engine as detected, and
   wherein an amount of particulate matter exiting the combustion chamber is reduced by a predetermined amount compared to operation of the jet engine not using hydrogen gas based on an amount of the hydrogen gas traveling into the combustion chamber and an amount of fuel burned within the combustion chamber.

2. The portable hydrogen supplemental system according to claim 1, wherein air is injected into the combustion chamber along with the fuel and a flame is formed based on a mixture of the air and fuel, and a laminar flame speed of the jet fuel is variably adjusted based on the amount of hydrogen gas injected within the combustion chamber.

3. The portable hydrogen supplemental system according to claim 1, wherein the hydrogen gas injectors are located in at least one of an air intake of the jet engine, at an entrance of the combustion chamber, adjacent to at least one fuel spray nozzle of the combustion chamber, at either side of an igniter coupled with the combustion chamber, or within the combustion chamber, for supplying hydrogen gas to the combustion chamber.

4. The portable hydrogen supplemental system according to claim 3, wherein when the fuel within the combustion chamber ignites via the igniter the hydrogen gas within the combustion chamber ignites and thereby assists with burning of any unburned fuel adjacent to the hydrogen gas, within the combustion chamber.

5. The portable hydrogen supplemental system according to claim 1, further comprising:
   a hydrogen gas collector for collecting the hydrogen gas from the electrolyzer, wherein the electrolyzer,
   wherein the electrolyzer, when supplied with electrical power produces the hydrogen and oxygen gases from the nonelectrolyte water being supplied from the nonelectrolyte water tank via a supply line connected thereto, and supplies the hydrogen gas being produced, via the hydrogen gas collector, to the jet engine for combustion therein.

6. The portable hydrogen supplemental system according to claim 5,
   wherein the electrolyzer is disposed external of the nonelectrolyte water tank, and the oxygen gas supplied from the electrolyzer travels back to the nonelectrolyte water tank, and
   wherein the electrolyzer comprises:
   a plurality of layers, said layers being non-liquid and each layer being in adjacent contact with another one of said layers,
   wherein the plurality of layers includes at least two external layers and an internal layer which is disposed in adjacent contact between the external layers,
   wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and
   wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer.

7. The portable hydrogen supplemental system according to claim 6, further comprising:
a fill spout supplying the nonelectrolyte water to the nonelectrolyte water tank;
a float assembly connected with the fill spout and housed within the nonelectrolyte water tank, and configured to perform a floating operation indicative of a level of the nonelectrolyte water within the nonelectrolyte water tank; and
a water level sensor disposed at a bottom surface of the nonelectrolyte water tank and configured to magnetically communicate with the float assembly, to determine the level of the nonelectrolyte water based on a position of the float assembly.

8. The portable hydrogen supplemental system according to claim 7, wherein the float assembly comprises:
a shaft extending from the fill spout in a downward direction;
a holding portion connected with the shaft and housing a magnet therein,
wherein the magnet is in communication with the water level sensor when the float assembly is positioned at rest at a bottom of the nonelectrolyte water tank to indicate that the level of the nonelectrolyte water is low, and
wherein the holding portion floating along the shaft, in an upward direction towards the fill spout as the nonelectrolyte water tank is filled with the nonelectrolyte water to indicate that the level of the nonelectrolyte water is increasing, and when the nonelectrolyte water tank is filled with the nonelectrolyte water, the holding portion of the float assembly rests at a top surface of the nonelectrolyte water tank inside the fill spout, closing the fill spout.

9. The portable hydrogen supplemental system according to claim 5, wherein the hydrogen gas collector comprises:
a hydrogen gas collection portion for receiving the hydrogen gas and an amount of the nonelectrolyte water, from the electrolyzer therein; and
a float valve disposed in communication with the hydrogen gas collection portion, for receiving the nonelectrolyte water therein to be returned to the nonelectrolyte water tank.

10. The portable hydrogen supplemental system according to claim 9, wherein the hydrogen gas collector further comprises:
a cover portion covering a top opening of the hydrogen gas collection portion and comprising:
a protrusion portion disposed at a center region along an interior surface the cover portion and extending in a downward direction within the hydrogen gas collection portion; and
a plurality of flange portions spaced a predetermined apart along the interior surface of the cover portion and surrounding the protrusion portion at the center region; and
a ball seal stored therein and configured to seal the top opening of the hydrogen gas collection portion,
wherein during operation of the hydrogen gas collector, as the hydrogen gas collection portion is filled with the hydrogen gas and nonelectrolyte water, the ball seal floats toward the top opening of the hydrogen gas collection portion and the plurality of flanges direct the ball seal to the protrusion portion to be positioned and seals the top opening of the hydrogen gas collection portion.

11. The portable hydrogen supplemental system according to claim 10, wherein the hydrogen gas collection portion comprises:
a valve receiving portion including a first receiving section and a second receiving section formed of a through-hole at a bottom thereof; and
a return outlet provided to be connected with the nonelectrolyte water tank;
the float valve including a top portion disposed within the first receiving section; and
a bottom portion disposed within the through-hole of the second receiving section, and configured to float as the hydrogen gas and the nonelectrolyte water fills the hydrogen gas collection portion.

12. The portable hydrogen supplemental system according to claim 11, wherein the hydrogen gas collector collects the hydrogen gas, the nonelectrolyte water traveling with the hydrogen gas is circulated to the valve receiving portion, to be returned to the nonelectrolyte water tank.

13. The portable hydrogen supplemental system according to claim 12, further comprises:
a stopper disposed on a side surface of the float valve, and configured to block the hydrogen gas from returning to the nonelectrolyte water tank.

14. The portable hydrogen supplemental system according to claim 2, wherein the onboard diagnostic interface is in communication with the jet engine via the control terminal and in communication with the power supply of the portable hydrogen supplemental system, and controls power to be supplied to the power supply.

15. The portable hydrogen supplemental system according to claim 14, wherein the onboard diagnostic interface is configured to receive at least one of rotational speed information, speed information, or fuel usage information.

16. The portable hydrogen supplemental system according to claim 15, wherein the amount of hydrogen gas injected is based on the rotational speed information, the speed information or fuel usage information or a combination thereof, to variably adjust the laminar flame speed of the jet fuel within the combustion chamber.

17. The portable hydrogen supplemental system according to claim 16,
wherein during a take-off operation or a climbing operation of the jet, the amount of hydrogen gas injected is increased, and
wherein during a leveling operation, a cruising operation or a landing operation of the jet, the amount of hydrogen gas injected is decreased.

18. A method of supplying hydrogen gas to a jet engine of a jet, comprising:
supplying, from a nonelectrolyte water tank mounted inside the housing unit, nonelectrolyte water to an electrolyzer;
detecting, by an onboard diagnostic interface in communication with a control terminal of the jet, operation of the jet engine;
supplying, by a power supply, electrical power in the form of a voltage to the electrolyzer upon detecting that the jet engine is in operation;
producing, by the electrolyzer when supplied with the electrical power, hydrogen and oxygen gases from the nonelectrolyte water from the nonelectrolyte water tank;

injecting, by a plurality of hydrogen gas injectors, the hydrogen gas into the jet engine; and varying an amount of the hydrogen gas injected into the jet engine based on the operation of the jet engine as detected, wherein the hydrogen gas travels into a combustion chamber of the jet engine, to assist with burning of fuel within the combustion chamber, and wherein an amount of particulate matter exiting the combustion chamber is reduced by a predetermined amount compared to operation of the jet engine not using hydrogen gas based on an amount of the hydrogen gas traveling into the combustion chamber and an amount of fuel burned within the combustion chamber.

19. The method according to claim 18, further comprising:

variably adjusting a laminar flame speed of the jet fuel within the combustion chamber based on a mixture of air and fuel, based on the amount of hydrogen gas injected within the combustion chamber.

20. The method according to claim 18, further comprising:

collecting, by a hydrogen gas collector, the hydrogen gas from the electrolyzer, wherein the electrolyzer, when supplied with electrical power produces the hydrogen and oxygen gases from the nonelectrolyte water being supplied from the nonelectrolyte water tank via a supply line connected thereto, and supplies the hydrogen gas being produced, via the hydrogen gas collector, to the internal combustion engine for combustion therein.

21. The method according to claim 20, wherein the electrolyzer is disposed external of the nonelectrolyte water tank, wherein the oxygen gas supplied from the electrolyzer travels back to the nonelectrolyte water tank;

wherein the electrolyzer comprises:

a plurality of layers, said layers being non-liquid and each layer being in adjacent contact with another one of said layers, wherein the plurality of layers includes at least two external layers and an internal layer which is disposed in adjacent contact between the external layers, wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer.

22. The method according to claim 18, further comprising:

supplying the nonelectrolyte water to the nonelectrolyte water tank;

performing, via a float assembly, a floating operation indicative of a level of the nonelectrolyte water within the nonelectrolyte water tank; and sensing, via a water level sensor disposed at a bottom surface of the nonelectrolyte water tank, a level of the nonelectrolyte water by magnetically communicating with the float assembly.

23. The method according to claim 22, further comprising:

magnetically communicating, a magnet within a holding portion of a float assembly in the nonelectrolyte water tank, with the water level sensor;

wherein the float assembly is positioned at rest at a bottom of the nonelectrolyte water tank to indicate that the level of the nonelectrolyte water is low, and wherein the holding portion floating along the shaft, in an upward direction towards the fill spout as the nonelectrolyte water tank is filled with the nonelectrolyte water to indicate that the level of the nonelectrolyte water is increasing, and when the nonelectrolyte water tank is filled with the nonelectrolyte water, the holding portion of the float assembly rests at a top surface of the nonelectrolyte water tank inside the fill spout, closing the fill spout.

24. The method according to claim 20, further comprising:

receiving, via the hydrogen gas collector, the hydrogen gas and an amount of the nonelectrolyte water, from the electrolyzer, therein; and returning, via a float valve within the hydrogen gas collector, the amount of nonelectrolyte water to the nonelectrolyte water tank.

25. The method according to claim 19, further comprising:

varying the amount of hydrogen gas to be injected based on rotational speed information, speed information or fuel usage information or a combination thereof of the jet engine, and variably adjusting the laminar flame speed of the jet fuel based on the amount of hydrogen gas.

26. The method according to claim 25, further comprising:

increasing the amount of hydrogen gas injected, during a take-off operation or a climbing operation of the jet, and decreasing the amount of hydrogen gas injected, during a leveling operation, a cruising operation or a landing operation of the jet.

* * * * *